United States Patent [19]

Klein et al.

[11] Patent Number: 4,528,597
[45] Date of Patent: Jul. 9, 1985

[54] TELEVISION SET

[75] Inventors: Walter Klein, Erlangen-Tennenlohe; Hans Mangold, Fuerth, both of Fed. Rep. of Germany

[73] Assignee: Grundig E.M.V., Fuerth, Fed. Rep. of Germany

[21] Appl. No.: 439,229

[22] Filed: Nov. 4, 1982

[30] Foreign Application Priority Data

May 11, 1981 [DE] Fed. Rep. of Germany ....... 3143932

[51] Int. Cl.³ .............................................. H04N 5/64
[52] U.S. Cl. .................................................... 358/254
[58] Field of Search ............... 358/230, 240, 254, 241, 358/242, 248, 188, 249, 217, 255; D14/77, 79, 80, 81, 82, 84, 85, 102; 340/700, 716, 717, 720, 718; 455/349, 348; 179/2 TV, 179; 312/7.1, 7.2, 201, 320; 339/31 R, 32 R, 8 R, 8 A, 8 P, 45 R

[56] References Cited

U.S. PATENT DOCUMENTS

| D. 176,492 | 1/1956 | Barofsky | D56/4 |
|---|---|---|---|
| 3,103,398 | 9/1963 | Phelps | 339/4 |
| 3,491,326 | 1/1970 | Pfister et al. | 339/45 R |
| 4,173,024 | 10/1979 | Miller | 358/115 |
| 4,438,458 | 3/1984 | Munscher | 358/254 |

FOREIGN PATENT DOCUMENTS

| 222804 | 8/1959 | Australia | 358/254 |
|---|---|---|---|
| 2414021 | 10/1975 | Fed. Rep. of Germany . | |
| 1180110 | 6/1959 | France | 358/254 |
| 518384 | 3/1955 | Italy | 358/254 |
| 41061 | 3/1980 | Japan | 358/254 |

Primary Examiner—John C. Martin
Assistant Examiner—Victor R. Kostak
Attorney, Agent, or Firm—Kane, Dalsimer, Kane, Sullivan & Kurucz

[57] ABSTRACT

The television set which includes a separate modular video screen and a separate receiver both of a generally flat configuration with the video screen pluggable (connectable) at a plurality of outlets in the receiver wherein it is generally perpendicular to the receiver or in tandem therewith.

15 Claims, 7 Drawing Figures

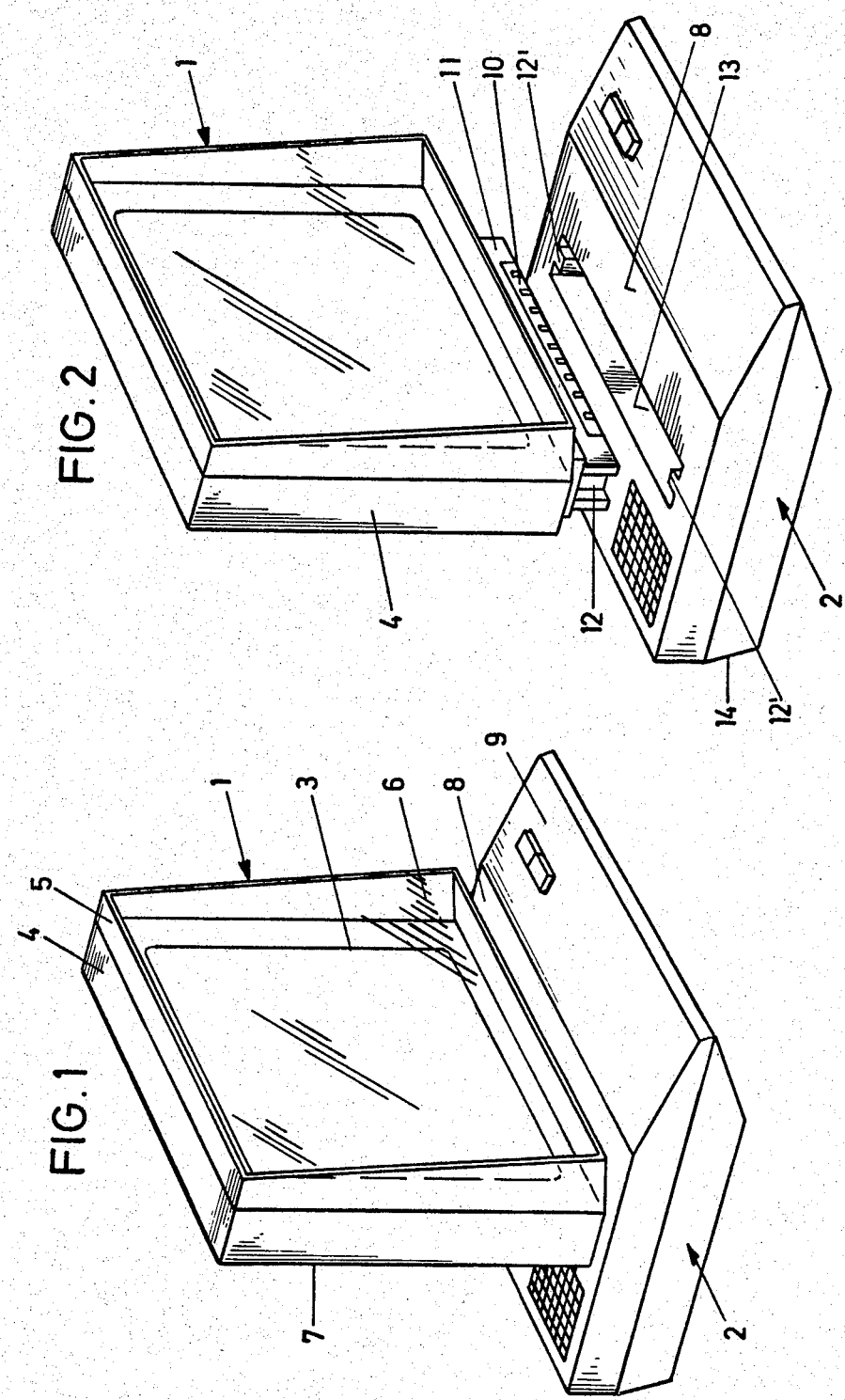

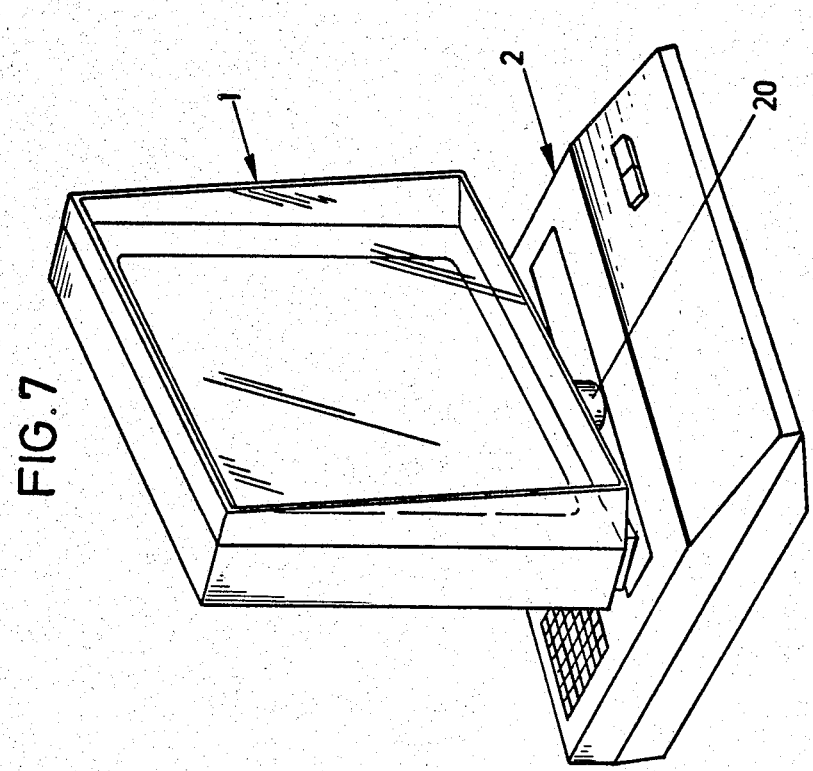

TELEVISION SET

FIELD OF THE INVENTION

The present invention relates to a television set, particularly one that is modular in nature.

BACKGROUND OF THE INVENTION

In traditional or conventional television sets, the size of the sets was principally determined by the size of the video screen's desired face and the corresponding depth or width of the picture tube required. Accordingly, while the size of the video screen face varies greatly to accommodate the different viewer requirements, the width of the television sets has always posed a problem in reducing the overall dimensions of the set and the technology required to reduce it was not available. This situation has recently been rectified and the reduction in the depth required has been substantially reduced in video screens. These "flat video screens" such as those presently manufactured now permit a considerable reduction of the set depth and allow for versatility in design of television sets not heretofore possible.

SUMMARY OF THE INVENTION

It is therefore a principal object of the invention to provide for a flat video screen television set which is aesthetically pleasing yet functional and versatile and accommodates diverse usage under a variety of circumstances.

In this regard the present invention provides for a television set which may be assembled out of a plurality of modular units operationally coupled together in a variety of ways to suit the viewer needs. A flat video screen is provided in modular form and adapted to be coupled to a audio/video receiver module. This may be accomplished by "plug-in-bar" of the screen frame-plugged into a receiving portion of the receiver so as to communicate the video signals therebetween.

The receiver is generally flat and rectangular in shape and is provided with two bar receiving outlets positioned so as to allow the screen to be positioned perpendicularly with respect to the flat portion of the receiver resulting in a free standing set, or in tandem so as to enable the set to be hung from perhaps a wall etc. The plug-in-bar may alternatively be fitted with a shaft allowing the video screen to rotate on the shaft. Further, convenient and versatile mounting receptacles are provided for external audio speakers to allow for convenient mounting thereon.

The present invention therefore has the advantage that since the television set is being manufactured without the knowledge beforehand in what manner it is to be used, it allows for interchangeability with a few manipulations: operating as a standing set; or as a hanging wall set; or in a separated arrangement of video and receiver portions. Furthermore, when the inventive television set is operated as a standing set, larger loudspeaker boxes may be utilized in a mountable or detachable form.

BRIEF DESCRIPTION OF THE DRAWINGS

Thus by the present invention its objects, advantages and others will be readily realized, the description of which should be taken in conjunction with the drawings wherein:

FIG. 1 is a perspective view of the modular television set, incorporating the teachings of the present invention;

FIG. 2 is a perspective view of the television set shown in FIG. 1, showing the video screen portion detached from the receiver portion, incorporating the teachings of the present invention;

FIG. 7 is a perspective view of the television set wherein the video screen is rotationally maintained on the receiver portion.

DETAILED DESCRIPTION OF THE PREFERRED EMBODIMENTS

Figure 3:
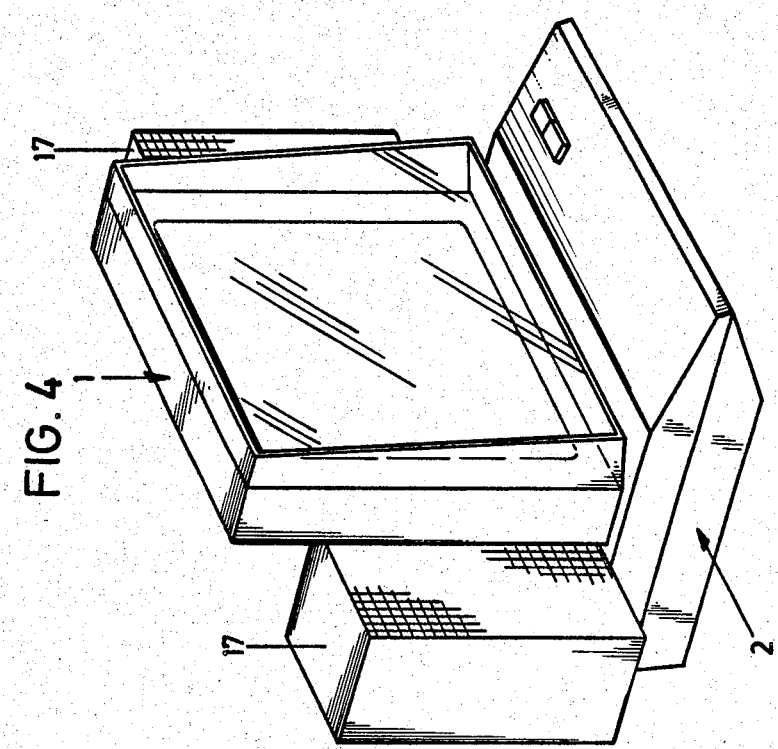
FIG. 3 is a perspective view of the modular television set showing the screen and receiver portions arranged in tandem.

With reference now more particularly to the drawings, in FIG. 1 there is illustrated a television set which includes a video screen portion 1 and a receiver portion 2. Both portions 1 and 2 have a rectangular box shape and are of about uniform width and height. The video portion 1 is plugged vertically in the flat receiver portion as illustrated in FIG. 2. The video portion 1 contains a flat video screen 3 which is encompassed by a relatively small frame 4. A blind frame 5 is also provided and is mounted on the front of the video screen 3 as an extension of frame 4. If desired, an optical filter plane 6 with a desired coloration may also be added to the screen 3 in front of the blind frame.

The rear side of the screen portion 1 is covered by a substantially flat rear wall 7, and can be integrally connected, if so desired, with the frame 4 which maintains the flat video screen or separately attached. Note that the electrical elements (i.e printed circuit board) used in displaying the picture may be conveniently located between the video screen 3 and the rear wall 7.

The receiver portion 2 is provided with a control panel 9 which is in a slight incline with respect to its flat horizontal surface or cover face 8. While only a few keys are shown, it should be understood the illustrated situation is when the television set is remote controlled. However, if this feature is not desired, then of course additional manual keys may readily be added to the panel. The rear side 14 or bottom of receiver portion 2 may be provided with the electrical connections (i.e. power, antenna) for the set.

Turning now to FIG. 2, there is shown the screen portion 1 shortly before it is plugged into the receiver portion 2. In this regard, a small plug-in bar 10 with a plurality of electrical contacts is provided on the base 11 of the video portion 1. The base 11 may be integrally connected with the frame 4 of video portion 1 and may include oppositely disposed guide elements 12 which during the connecting of both portions (video 1 and receiver 2) engage in corresponding guide elements of the receiver portion 2 so as to guide the bar into the outlet or opening 13 on the cover face 8 and properly position the electrical connections on the bar 11 with those in the receiver portion 2 (not shown) so as to allow the passing of video signals therebetween while detachably maintaining the two portions together. Once fully inserted, the tolerances are such that the portions are securely maintained together, however, the two portions may be mechanically locked together by way of a locking connection (not shown).

Note, provided on the rear surface 14 of the receiver portion 2, is the same type opening as that of opening 13 provided on the cover face. This rear surface opening would include a guide element and corresponding electrical contacts so as to allow the screen portion 1 to be plugged into either the opening on the face 8 or rear side 14 of the receiver portion 2.

In this regard, reference is made to FIG. 3 which shows the video portion 1 plugged into the opening on the small rear side 14 of the receiver portion 2 so as to result in a flat configuration of the television set. When connected in this manner, the television set may be suspended on any given vertical wall like a picture. For this purpose, devices for mounting or suspending of the set are provided on the bottom or rear side, preferably of the receiver portion 2. The opening 13 on face 8 in this setting is unused and may be covered with cover plate 15 to give the face 8 a smooth, elegant look.

Loudspeakers are provided and built-in the rear portion of the cover face 8 in the receiver portion 2, preferably on opposite sides thereof, and are covered by gates 16 as shown in FIGS. 2 and 3. Alternatively, the loudspeakers may be mounted in separate relatively flat boxes 17 which may be suspended on the wall a desired distance from the television set at, for example, the same height as shown and coupled to the receiver portion 2 by appropriate audio wiring.

Figure 4:
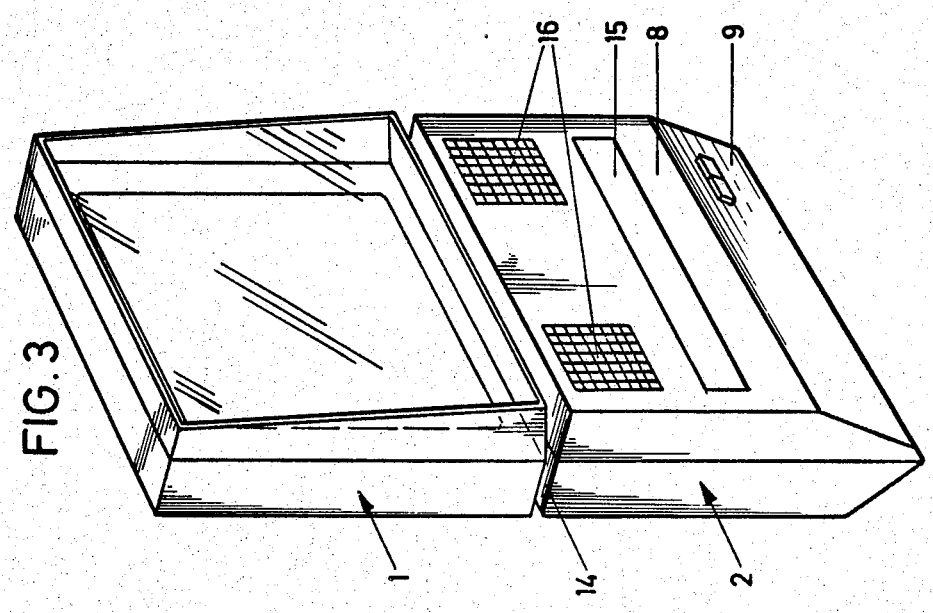
FIG. 4 is a perspective view of the television set similar to that of FIG. 1 with however audio or loudspeakers pivotally mounted on the flat portion of the receiver portion.
Figure 5:
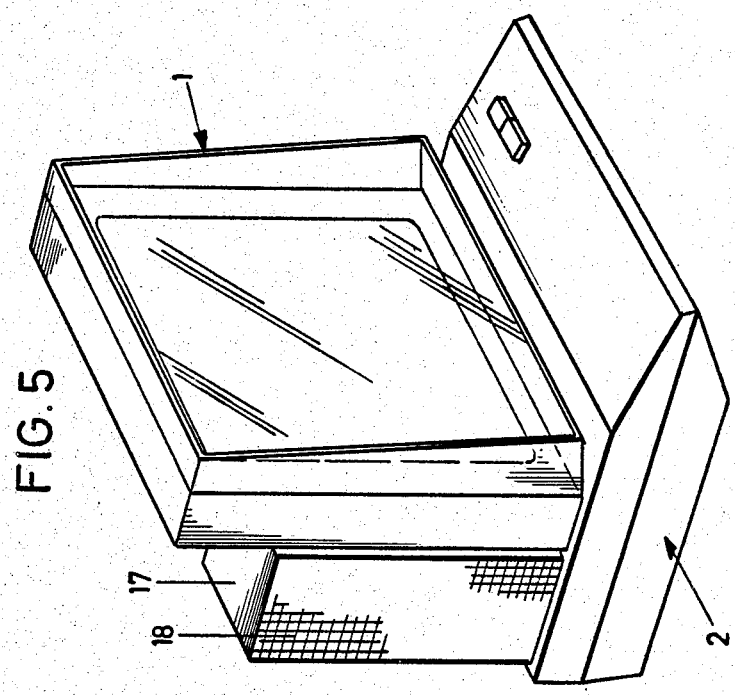
FIG. 5 is a perspective view of the television set similar to FIG. 4 with however loud speakers pivoted back.

Another possible arrangment of the loudspeaker boxes 17 can be seen in FIGS. 4 and 5, there preferably two of them are pivotably mounted on the set's receiver portion 2 and behind the video portion 1 with the loudspeaker boxes 17 pivotal backwards, preferably about their inner corners to a position shown in FIG. 5. Note the loudspeaker boxes 17 would be operational throughout its pivot and due to their pivotal nature, allows the sound side 18 of the boxes 17 to remain open and unimpeded while being closely flush with the screen portion 1 during operation.

Figure 6:
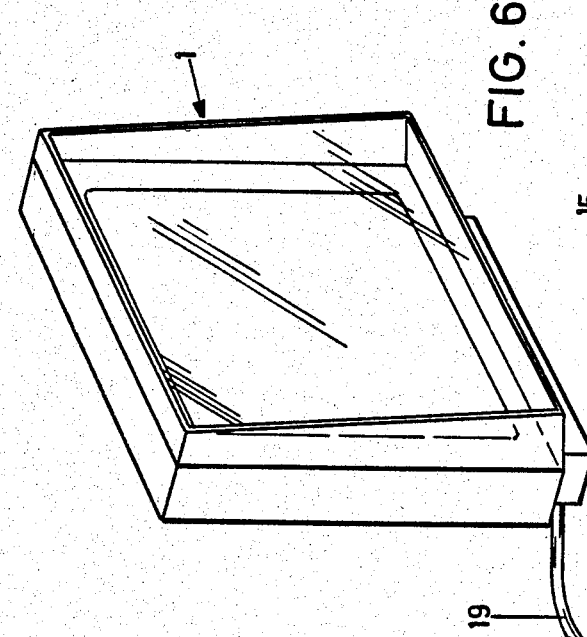
FIG. 6 is a perspective view of the television set with the video screen portion shown detached from the receiver portion with however a cable connected therebetween.

Turning now to FIG. 6, there is shown a situation where the screen portion 1 is detached from the receiver portion 2 while electrically connected via a flexible cable 19 of a desired length. The cable 19 would be provided with plug-in couplings on one or both ends thereof and would be perhaps plugged into the respective portions 1 and 2 without any changes to allow the passing of video signals. (The opening in receiver portion 2 for the plug-in connection which is not used may be closed by cover plate 15.) This will allow the video portion 1 to be suspended by itself or mounted in any given way without the receiver portion 2.

Turning now to FIG. 7, a central connection of the plug-in bar of the video portion 1 is provided in form of an intermediary plug-in device 20 which allows its rotation thereabout so as to rotate the picture in any desired direction adding to the versatility and convenience of the set.

Thus by the present invention, its objects, advantages, and others are readily realized and although preferred embodiments have been disclosed and described in detail herein its scope should not be limited thereby, rather its scope should be determined by that of the appended claims.

What is claimed is:

1. A television set comprising:
   a video screen portion which is self-contained in a first housing;
   a receiver portion which is self-contained in a second housing, said receiver portion capable of receiving and conveying audio and video signals;
   detachable connecting means coupled between said video screen and receiver portion so as to permit video or electrical signals to pass from the receiver portion to the video screen portion;
   said connecting means comprises a plug means and corresponding outlet means capable of receiving said plug means and providing a connection therebetween for passing signals;
   said plug means forms a part of said video screen portion and said outlet means includes at least two separate outlets positioned at different locations on the receiver portion, each outlet capable of receiving said plug means and providing a connection therebetween for passing signals; and wherein the decoupling of the plug means from the outlet means from one of said portions allows for the separation of the respective housings.

2. The television set inaccordance with claim 1 wherein said connecting means comprises a flexible cable coupled to and between said housings with said housings not otherwise mechanically connected.

3. The television set inaccordance with claim 1 wherein said connecting means includes shaft means coupled between said video screen portion and receiver portion and capable of allowing said screen portion to rotate with respect to said receiver portion.

4. The telvision set inaccordance with claim 1 wherein said plug means includes a plug-in-bar and said outlets are sized to conform to said bar and to mechanically and electrically couple said portions together.

5. The television set in accordance with claim 4 wherein said bar and outlets include intermeshing guide elements to facilitate the sliding acceptance of the plug-in-bar by the outlets.

6. The television set inaccordance with claim 5 which includes a flexible cable having a plug-in-bar at one end insertable in one of said outlets and at said cable opposite end being coupled to said video screen portion.

7. The television set inaccordance with claim 1 which includes a plurality of audio speakers maintained in respective speaker housings, at least one of said speaker housings being pivotably mounted on the receiver portion.

8. The television set inaccordance with claim 7 wherein at least one of said speaker housings is mounted on the cover face of the receiver portion and behind the video screen portion.

9. The television set inaccordance with claim 8 wherein said speaker housings include respective sound open sides with the plane of said open side being perpendicular to the plane of the video screen when in a first position and parallel to the plane of the video screen when the speaker housing is pivoted into a second position.

10. The television set inaccordance with claim 1 wherein said video screen portion includes a flat video screen maintained in said housing.

11. The television set inaccordance with claim 10 wherein said video screen portion and said receiver portion are maintained in respective flat generally rectangular housings of relatively the same dimension.

12. The television set inaccordance with claim 11 wherein said video screen portion includes a blind frame in front of said video screen and maintained by said housing, and an optical filter pane on the blind frame positioned in front of the video screen.

13. The television set inaccordance with claim 11 wherein said receiver portion includes a cover face and a rear side generally perpendicular thereto, said face and side having positioned thereon respective outlets.

14. The television set inaccordance with claim 13 which includes a cover plate which is adapted to cover an outlet.

15. The television set inaccordance with claim 13 wherein said receiver portion includes a front face with said cover face including a surface which angles downwardly towards said front face.

* * * * *

UNITED STATES PATENT AND TRADEMARK OFFICE
CERTIFICATE OF CORRECTION

PATENT NO. : 4,528,597
DATED : July 9, 1985
INVENTOR(S) : Walter Klein/Hans Mangold It is certified that error appears in the above-identified patent and that said Letters Patent is hereby corrected as shown below:

Column 2, Line 39: change "plane" to -pane-

Signed and Sealed this

Eighth Day of October 1985

[SEAL]

Attest:

DONALD J. QUIGG

Attesting Officer

Commissioner of Patents and Trademarks—Designate